(12) United States Patent
Bolourchi et al.

(10) Patent No.: US 9,447,276 B2
(45) Date of Patent: Sep. 20, 2016

(54) METHOD FOR REDUCING RESIDUAL LACTAM MONOMER FROM POLYAMIDE COMPOUNDS

(71) Applicant: PolyOne Corporation, Avon Lake, OH (US)

(72) Inventors: Maziyar Bolourchi, Sheffield Lake, OH (US); Roger W. Avakian, Solon, OH (US)

(73) Assignee: PolyOne Corporation, Avon Lake, OH (US)

( * ) Notice: Subject to any disclaimer, the term of this patent is extended or adjusted under 35 U.S.C. 154(b) by 481 days.

(21) Appl. No.: 13/972,030

(22) Filed: Aug. 21, 2013

(65) Prior Publication Data

US 2014/0057063 A1 Feb. 27, 2014

Related U.S. Application Data

(60) Provisional application No. 61/692,159, filed on Aug. 22, 2012.

(51) Int. Cl.
*C08L 77/02* (2006.01)
*C08G 69/46* (2006.01)

(52) U.S. Cl.
CPC ............... *C08L 77/02* (2013.01); *C08G 69/46* (2013.01); *Y10T 428/1352* (2015.01)

(58) Field of Classification Search
CPC .. C08L 77/02; C08G 69/46; Y10T 428/1352
See application file for complete search history.

(56) References Cited

U.S. PATENT DOCUMENTS 7,049,391 B2    5/2006  Gahr et al.
2007/0021558 A1*  1/2007  Shinohara ............ B62D 5/0409
                                                          525/66

* cited by examiner

*Primary Examiner* — Michael C Miggins
(74) *Attorney, Agent, or Firm* — John H. Hornickel

(57) ABSTRACT

Residual lactam monomer is reduced from compounds containing polyamide by adding a minor amount of polycarbodiimide during melt-mixing.

10 Claims, No Drawings

METHOD FOR REDUCING RESIDUAL LACTAM MONOMER FROM POLYAMIDE COMPOUNDS

CLAIM OF PRIORITY

This application claims priority from U.S. Provisional Patent Application Ser. No. 61/692,159 and filed on Aug. 22, 2012, which is incorporated by reference.

FIELD OF THE INVENTION

This invention concerns a method to reduce residual lactam monomer from polyamide.

BACKGROUND OF THE INVENTION

Polymers have transformed society by introducing materials which do not shatter, rot, or rust, as do ceramics, wood, and some metals.

Polymers are formed from monomers, and it has long been a goal of polymerization processors to use as much of the monomers as possible during polymerization, for both reasons of cost and reduction of reactive molecules amidst the macromolecule polymer.

SUMMARY OF THE INVENTION

Polyamide, and particularly polyamide 6, is a polymer which polymerization processors strive to reduce residual lactam monomer content. A variety of processes have been attempted. Some have been ineffective; some have been expensive.

What the art needs is a method of reducing residual lactam monomer from polyamide or compounds containing polyamide without adversely affecting the reason for using polyamide, the measurable physical properties of polyamide.

The present invention solves that problem by using a minor amount of polycarbodiimide in a melt mix with the polyamide. The resulting polyamide or compound containing polyamide demonstrates a reduction in residual lactam monomer content and an essential retention of polyamide's physical properties.

One aspect of the present invention is a method for reducing residual lactam content in a compound containing polyamide, comprising the steps of (a) selecting the polyamide; and (b) melt-mixing the polyamide with an effective amount of polycarbodiimide to reduce residual lactam without adversely affecting Notched Izod properties of the polyamide, measured by ASTM D-256.

EMBODIMENTS OF THE INVENTION

Polyamide Resin

Any polyamide made using a lactam monomer is a candidate for use in this invention. Polyamides made via ring opening polymerization of cyclic lactams are particularly susceptible to residual lactam being present because the polymer and the monomer move toward equilibrium at elevated temperatures; this environment is experienced during injection molding. The longer the time the polyamide 6 is at an elevated temperature the more lactam that is formed until a equilibrium content is attained. This residual and formed caprolactam, in the case of polycarpolactam, can result in undesirable splay and appearance issues.

Polyamide, especially polyamide 6 or polycaprolactam, is a major thermoplastic resin in the world of plastics. There are many commercial sources of polyamide on every continent, and the plastic articles made from polyamide-containing compounds are ubiquitous and useful.

Any number of grades of polyamide with a variety of melt flow index values or molecular weights can benefit from the method of this invention.

Polyamides, (nylons) comprise crystalline or resinous, high molecular weight solid polymers including copolymers and terpolymers having recurring amide units within the polymer chain. Polyamides can be prepared by polymerization of one or more epsilon lactams such as lactam, pyrrolidone, lauryllactam and aminoundecanoic lactam, or amino acid, or by condensation of dibasic acids and diamines.

Non-limiting examples of polyamides homopolymers and copolymers are polylactam (nylon 6), poly(12-aminododecanoic acid) (nylon 12) and the like.

Polyamide resin suitable for practice of the present invention may be used singly or as blends of two or more aliphatic polyamides or in combination with other resins containing nitrogen, oxygen, halogen, sulfur or other groups capable of interacting with aromatic functional groups such as halogen or acidic groups. The polyamide resin can also be blended with one or more suitable thermoplastic resins.

Suitable thermoplastic resins include resins selected from the group consisting of polyolefins, polyimides, polycarbonates, polyesters, polysulfones, polylactones, polyacetals, acrylonitrile-butadiene-styrene resins (ABS), polyphenyleneoxide (PPE), polyphenylene sulfide (PPS), polystyrene, styrene-acrylonitrile resins (SAN), styrene maleic anhydride resins (SMAC), aromatic polyketones (PEEK, PED, and PEKK), Surlyn™ ionomer, and mixtures thereof.

Preferably, polyamide can be used in plastic articles either as the only thermoplastic resin or blended with other thermoplastic resins, such as Surlyn™ ionomer resin from DuPont.

Polycarbodiimide

Any polycarbodiimide, especially an aromatic polycarbodiimide is a candidate for use in this invention. Commercially available polycarbodiimides can be a white to slightly yellow powder having a melting point greater 130° C. and an average molecular weight of more than 20,000 g/mole. Often, the percentage of carbodiimide moiety (N=C=N) content can be greater than about 13.

The conventional usage of polycarbodiimide has been as a hydrolysis agent for polymers including polyamide. While the use of polycarbodiimide in the method of this invention may assist in the hydrolysis resistance of polyamide, it is the performance of polycarbodiimide to reduce residual lactam monomer content which is truly unexpected.

Use of polycarbodiimide as a hydrolysis agent has been recommended in an amount of from about 1.0 to 2.5 weight percent of the polyamide-containing compound. With that knowledge, it can be estimated that that amount will not harm the polyamide-containing compound while also resulting in reduction of residual lactam monomer content.

Optional Additives

The polyamide-containing compound of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.elsevier.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

Table 1 shows acceptable, desirable, and preferable ranges of ingredients useful in the present invention, all expressed in weight percent (wt. %) of the entire compound. The compound can comprise, consist essentially of, or consist of these ingredients.

TABLE 1

| Ingredient (Wt. Percent) | Acceptable | Desirable | Preferable |
| --- | --- | --- | --- |
| Polyamide Resin | 26 99.8 | 32-99.5 | 37.5-99 |
| Other Thermoplastic Resin | 0-50 | 0-50 | 0-50 |
| Polycarbodiimide | 0.2-4 | 0.5-3 | 1-2.5 |
| Optional Additives | 0-20 | 0-15 | 0-10 |

Table 1 shows the final compound ingredients. The ingredients can be added into a reduced amount of the polyamide resin to form a concentrate or masterbatch for later dilution or "letdown" into the remainder of the polyamide resin. The ratio of letdown determines the amount of polyamide resin for the carrier of the concentrate and the amount of polyamide resin into which the concentrate is let down.

Processing

The preparation of compounds of the present invention is uncomplicated. The compound of the present can be made in batch or continuous operations.

Mixing in a continuous process typically occurs in an extruder that is elevated to a temperature that is sufficient to melt the polymer matrix with addition either at the head of the extruder or downstream in the extruder of the solid ingredient additives. Extruder speeds can range from about 50 to about 1000 revolutions per minute (rpm), and preferably from about 100 to about 500 rpm. Typically, the output from the extruder is pelletized for later extrusion or molding into polymeric articles.

Mixing in a batch process typically occurs in a mixer that is also elevated to a temperature that is sufficient to melt the polymer matrix to permit addition of the solid ingredient additives. The mixing speeds range from 60 to 1000 rpm and temperature of mixing can be ambient. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.elsevier.com), one can make articles of any conceivable shape and appearance using compounds of the present invention.

USEFULNESS OF THE INVENTION

Any plastic article presently made using polyamide-containing compound in any amount can benefit from the method of this invention, including without limitation those articles shaped by extruding, molding, calendering, thermoforming, etc. A brief and non-limiting list of plastic articles are transportation-related molded items (e.g., crash helmets and parts for vehicles such as bumpers and fenders); electrical equipment when flame retardants or reinforcing fillers are also added (e.g., plugs, connectors, boxes, and switches); and consumer appliance housings and containers (e.g., kitchen appliance housings and shells, and consumer electronics housings and cases).

The Examples further explain this invention.

EXAMPLES

Table 2 shows the formulations of Comparative Examples A-F and Examples 1-2. Each of the resin samples A-F and 1-2 were dried overnight at 80° C. and thereafter blended with additive in plastic bag. Each mixture was then incorporated into injection molding press using a processing profile ranging between 230-245° C. at barrel and a mold temperature of 90° C. Moderate back pressure ranging between 75-125 psi and screw rpm ranging between 75-125 were used to distribute/disperse additive. Standard ASTM test specimens including Tensile, Flexural and Izod bars were prepared for characterization. Residual lactam monomer content was determined using the procedure described in U.S. Pat. No. 7,049,391 B2 Example 1 at Col. 8, Lines 5-11.

Comparisons of the test results of Comparative Examples B and C and Example 1 with Comparative Example A and of Comparative Examples E and F and Example 2 with Comparative Example D, respectively, are reported as percentage deviation from Comparative Examples A and D, respectively.

TABLE 2

| | Example | | | | | | | |
| --- | --- | --- | --- | --- | --- | --- | --- | --- |
| Material | A | B | 1 | C | D | E | 2 | F |
| | Formulation (%) | | | | | | | |
| Ultramid B27 polyamide 6 (BASF) | 100 | 99 | 99 | 99 | | | | |
| LTL SURSG 201UN (Contains a proprietary blend of Surlyn ™ ionomer and polyamide 6) (LTL Color Compounders, Morrisville, PA) | | | | | 100 | 99 | 99 | 99 |
| Succinic Anhydride (Dixie Chemical) | | 1 | 0.5 | | | 1 | 0.5 | |
| Stabaxol P400 aromatic | | | 0.5 | 1 | | | 0.5 | 1 |

TABLE 2-continued

| Material | Example | | | | | | | |
|---|---|---|---|---|---|---|---|---|
| | A | B | 1 | C | D | E | 2 | F |
| | Formulation (%) | | | | | | | |
| polycarbodiimide (RheinChemie, Chardon, OH) | | | | | | | | |
| TOTAL | 100 | 100 | 100 | 100 | 100 | 100 | 100 | 100 |
| | Analytical Data | | | | | | | |
| Residual Lactam (ppm) (Procedure described in U.S. Pat. No. 7,049,391 B2 Example 1, Col. 8, Lines 5-11 | 2224 | 1583 | 1555 | 1381 | 1008 | 882 | 876 | 849 |
| Percent Reduction | | 28.80% | 30.10% | 37.90% | | 12.50% | 13.10% | 15.80% |
| | Mechanical Properties | | | | | | | |
| Tensile Modulus (ksi), 2"/min (ASTM D-638) | 305 | 310 | 297 | 301 | 189 | 181 | 184 | 177 |
| Tensile Strength (psi), 2"/min (ASTM D-638) | 10100 | 10300 | 10200 | 10400 | 5959 | 5990 | 6010 | 5670 |
| Tensile Elongation (%), 2"/min (ASTM D-638) | 18 | 26 | 62 | 30 | 130 | 150 | 140 | 97 |
| Flex Modulus (ksi), 0.5"/min (ASTM D-790) | 356 | 366 | 354 | 361 | 195 | 182 | 186 | 180 |
| Flex Strength, (psi), 0.5"/min (ASTMD-790) | 15685 | 15824 | 15312 | 15609 | 8398 | 8014 | 8188 | 7961 |
| Notched Izod (ft-lb/in) (ASTM D-256) | 0.99 | 0.87 | 1.2 | 0.72 | 23.74 | 5.94 | 22.23 | 8.42 |
| | Property Retention/Improvement (Control of Comparative Example A and D, respectively = 0%) | | | | | | | |
| Tensile Modulus | | 1.60% | −2.60% | −1.30% | | −4.20% | −2.60% | −6.30% |
| Tensile Strength | | 2.00% | 1.00% | 3.00% | | 0.50% | 0.90% | −4.80% |
| Tensile Elongation | | 44.40% | 244.40% | 66.70% | | 15.40% | 7.70% | −25.40% |
| Flex Modulus | | 2.80% | −0.60% | 1.40% | | −6.70% | −4.60% | −7.70% |
| Flex Strength | | 0.90% | −2.40% | −0.50% | | −4.50% | −2.40% | −5.10% |
| Notched Izod | | −12.00% | 20.80% | −27.50% | | −75.00% | −6.40% | −64.50% |

A comparison among Comparative Examples A-C with Example 1 shows that the use of succinic anhydride alone or with polycarbodiimide may reduce the amount of residual lactam monomer but causes a loss of physical properties of the polyamide 6, especially Notched Izod toughness.

The same comparison among Comparative Examples D-F with Example 2 shows the same type of reduction of the amount of residual lactam monomer but causes an even greater loss of physical properties for the blend of Surlyn™ ionomer and polyamide 6, especially Notched Izod toughness.

The invention is not limited to the above embodiments. The claims follow.

What is claimed is:

1. A method for reducing residual lactam content in a compound containing polyamide, comprising the steps of:
   (a) selecting the polyamide containing residual lactam;
   (b) melt-mixing the polyamide with an effective amount of polycarbodiimide to reduce the residual lactam without reducing Notched Izod properties of the polyamide, measured by ASTM D-256 by more than 6.4%;
   wherein the polycarbodiimide has a melting point greater 130° C. and an average molecular weight of more than 20,000 g/mole.

2. The method of claim 1, wherein the polyamide comprises polycaprolactam homopolymers, polycaprolactam copolymers, poly(12-aminododecanoic acid) homopolymers, or poly(12-aminododecanoic acid) copolymers.

3. The method of claim 1, wherein the polyamide is blended with a resin selected from the group consisting of polyolefins, polyimides, polycarbonates, polyesters, polysulfones, polylactones, polyacetals, acrylonitrile-butadiene-styrene resins, polyphenylene ether, polyphenylene sulfide, polystyrene, styrene-acrylonitrile resins, styrene maleic anhydride resins, aromatic polyketones, Surlyn™ ionomer, and mixtures thereof.

4. The method of claim 1, wherein the compound contains ingredients in the following weight percent ranges:

| | |
|---|---|
| Polyamide Resin | 26-99.8 |
| Other Thermoplastic Resin | 0-50 |
| Polycarbodiimide | 0.2-4 |
| Optional Additives | 0-20. |

5. The method of claim 1, wherein the compound contains ingredients in the following weight percent ranges:

| | |
|---|---|
| Polyamide Resin | 32-99.5 |
| Other Thermoplastic Resin | 0-50 |
| Polycarbodiimide | 0.5-3 |
| Optional Additives | 0-15. |

6. The method of claim 1, wherein the compound contains ingredients in the following weight percent ranges:

| | |
|---|---|
| Polyamide Resin | 37.5-99 |
| Other Thermoplastic Resin | 0-50 |
| Polycarbodiimide | 1-2.5 |
| Optional Additives | 0-10. |

7. A compound prepared according the method of claim 1.

8. A plastic article shaped from the compound of claim 7.

9. The article of claim 8, wherein the article is shaped by extruding, molding, calendering, or thermoforming.

10. The article of claim 8, wherein the article is a transportation-related molded item, electrical equipment, or a consumer appliance housing or container.

\* \* \* \* \*